United States Patent [19]
Kobatake

[11] Patent Number: 5,499,183
[45] Date of Patent: Mar. 12, 1996

[54] CONSTANT VOLTAGE GENERATING CIRCUIT HAVING STEP-UP CIRCUIT

[75] Inventor: Hiroyuki Kobatake, Tokyo, Japan

[73] Assignee: NEC Corporation, Tokyo, Japan

[21] Appl. No.: 352,675

[22] Filed: Nov. 30, 1994

[30] Foreign Application Priority Data

Nov. 30, 1993 [JP] Japan .................... 5-298800

[51] Int. Cl.⁶ .................... H02M 3/18; G05F 3/16
[52] U.S. Cl. .................... 363/59; 363/60; 327/536
[58] Field of Search .................... 363/59, 60; 327/535, 327/536, 537, 538, 540, 541, 543

[56] References Cited

U.S. PATENT DOCUMENTS

| | | | |
|---|---|---|---|
| 4,871,979 | 10/1989 | Shearer et al. | 330/253 |
| 4,876,462 | 10/1989 | Kobatake et al. | 327/536 |
| 5,197,033 | 3/1993 | Watanabe et al. | 365/226 |
| 5,394,027 | 2/1995 | Park | 327/536 |
| 5,432,469 | 7/1995 | Tedrow et al. | 327/534 |
| 5,436,821 | 7/1995 | Inoue | 363/60 |

FOREIGN PATENT DOCUMENTS

| | | |
|---|---|---|
| 0350462 | 1/1990 | European Pat. Off. . |
| 62-197998 | 9/1987 | Japan . |
| 4-372571 | 12/1992 | Japan . |

*Primary Examiner*—Matthew V. Nguyen
*Attorney, Agent, or Firm*—Young & Thompson

[57] ABSTRACT

A constant voltage generating circuit comprises a charge pump circuit for generating a high voltage on a high voltage output terminal, a clamp circuit having a P-channel MOSFET having a drain and a gate interconnected to each other and a source connected to the high voltage output terminal and an anode-grounded zener diode having a cathode connected to the drain of the P-channel MOSFET. A charge detecting circuit generates a charge detection signal when the amount of electric charge having flowed through the clamp circuit reaches a predetermined value. A clock control circuit includes a RS flipflop reset by a reset signal and set by the charge detection signal, and operates to stop application of a clock signal to the charge pump circuit on the basis of an output of the RS flipflop.

6 Claims, 9 Drawing Sheets

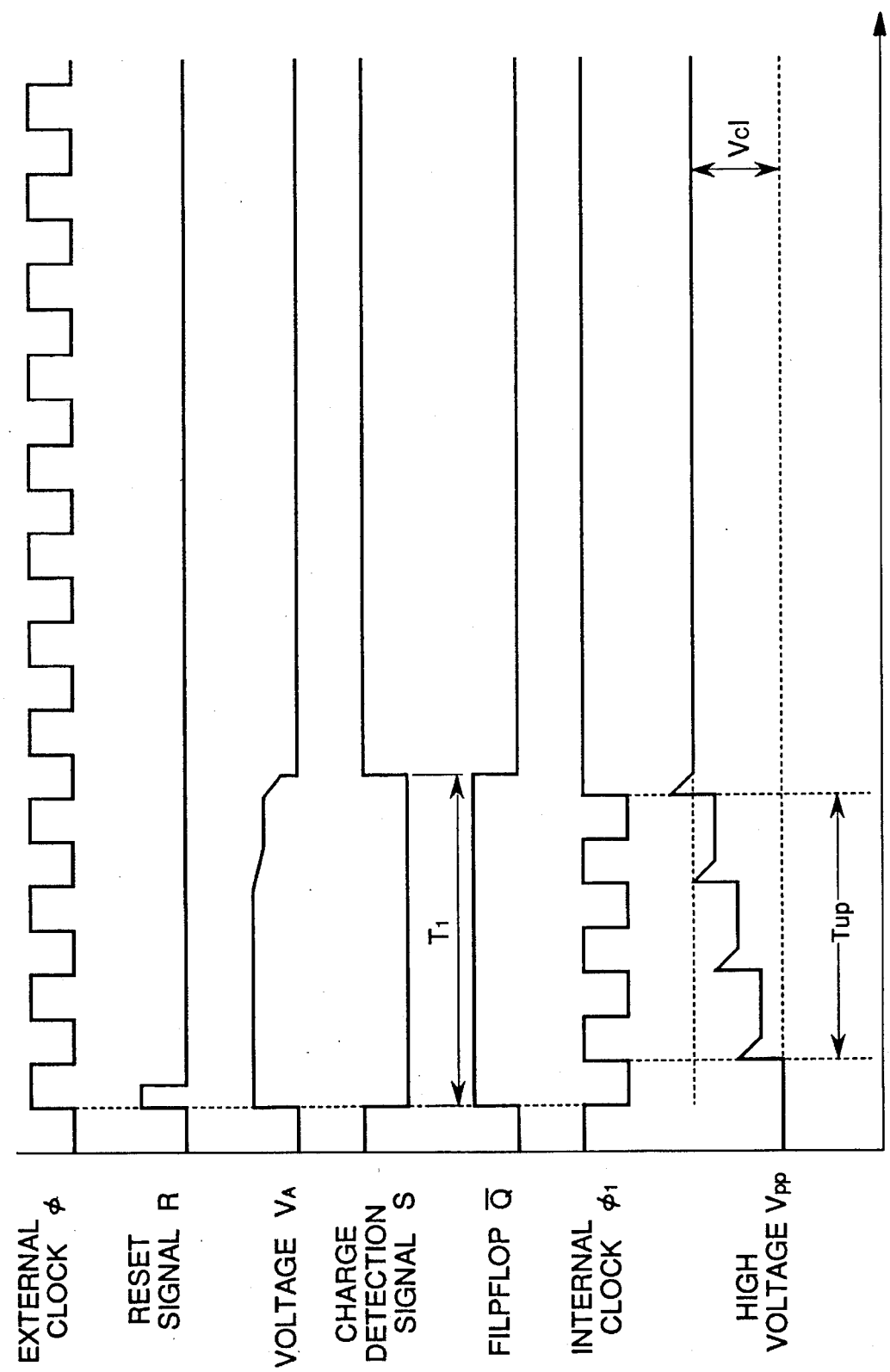

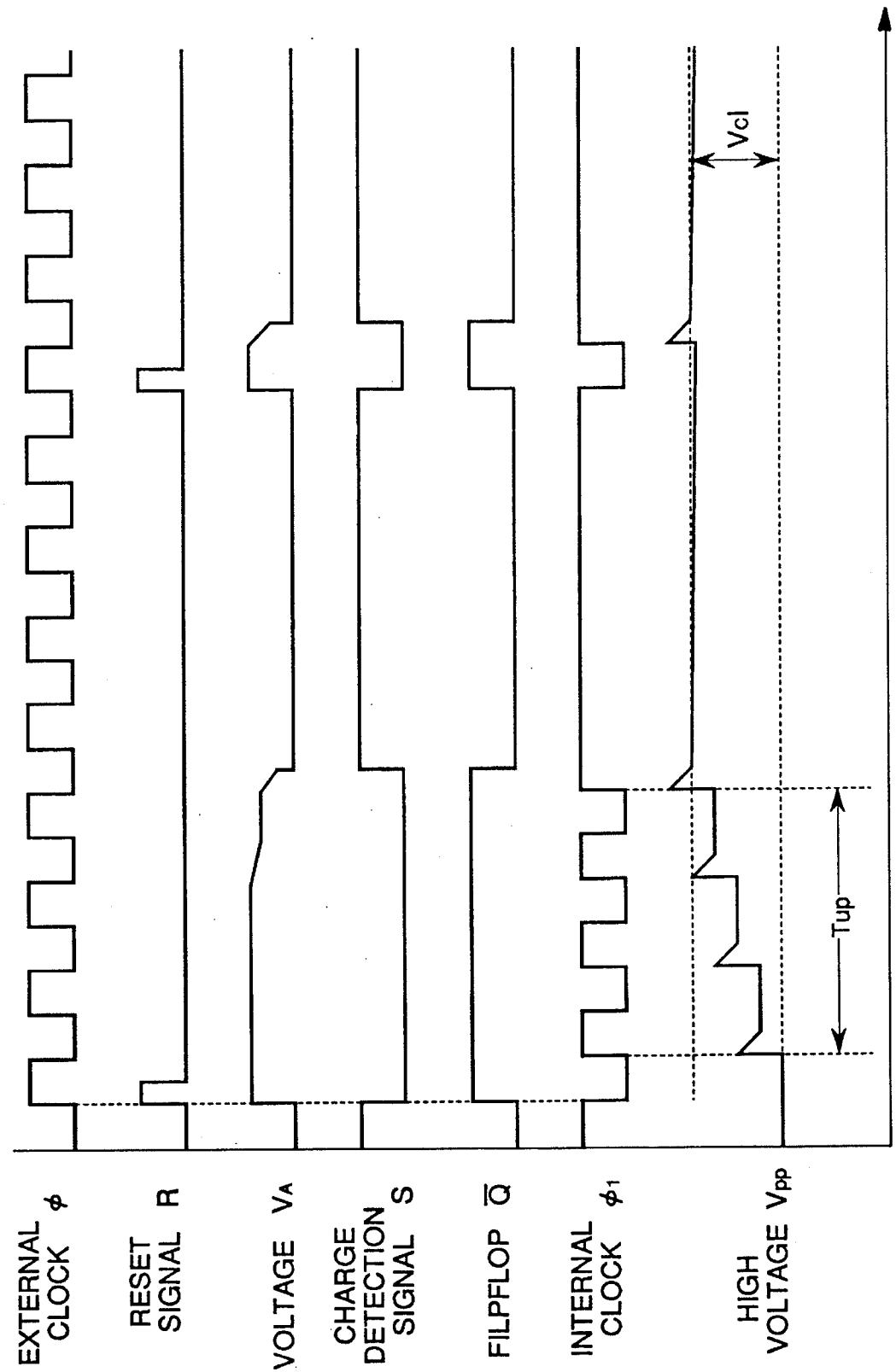

CONSTANT VOLTAGE GENERATING CIRCUIT HAVING STEP-UP CIRCUIT

BACKGROUND OF THE INVENTION

1. Field of the Invention

The present invention relates to a constant voltage generating circuit, and more specifically to a constant voltage generating circuit having a step-up circuit.

2. Description of Related Art

One example of this type constant voltage generating circuit is disclosed in Japanese Patent Application Laid-open Publication JP-A-4-372571. Referring to FIG. 1A, there is shown a circuit equivalent to the constant voltage generating circuit disclosed in this publication JP-A-4-372571, which is modified to have a step-up circuit composed of an increased number of elements so as to be compared with embodiments of the present invention explained hereinafter. This constant voltage generating circuit comprises a step-up circuit 50, a clamp circuit 60a, a voltage detecting circuit 70a and a clock control circuit 80a.

The step-up circuit 50 includes a series-connected N-channel MOSFETs (gate-insulated field effect transistor) 51 to 55 each of which has a drain electrode and a gate electrode interconnected to each other and which are connected between a voltage supply voltage terminal 92 (Vdd) and a high voltage output terminal 100 (Vpp). A gate-drain connecting node of each of the N-channel MOSFETs 52 and 54 is connected through a capacitor 56 or 58 to an output of an inverter $I_{51}$, and a gate-drain connecting node of each of the N-channel MOSFETs 53 and 55 is connected through a capacitor 57 or 59 to an output of an inverter 152. An input of the inverter $I_{51}$ is connected to a clock input terminal 94 ($\phi_5$), and an input of the inverter $I_{52}$ is connected to the output of the inverter $I_{51}$. With this arrangement, a high voltage Vpp is generated with a clock signal $\phi_5$ applied to the clock input terminal 94.

The clamp circuit 60a includes a P-channel MOSFET 61 having a gate connected to the voltage supply voltage terminal 92 (Vdd) and a source electrode connected to the high voltage output terminal 100 (Vpp), and an N-channel MOSFET 62 having a drain connected to a drain of the P-channel MOSFET 61, a gate connected to the voltage supply voltage terminal 92 (Vdd) and a source electrode connected to ground.

The voltage detecting circuit 70 is composed of an inverter $I_{71}$ having an input connected to a connection node B between the P-channel MOSFET 61 and the N-channel MOSFET 62.

The clock control circuit 80a has a NAND gate $N_{81}$ having one input connected to an external clock terminal 96 ($\phi$) and the other input. connected to an output line D of the inverter $I_{71}$. An output of the NAND gate $N_{81}$ is connected to the clock input terminal 94 ($\phi_5$).

Now, operation of the above mentioned constant voltage generating circuit will be described with reference to FIG. 1B.

When a step-up operation is started, since a potential Vpp on the high voltage output terminal 10 is at a low level, the P-channel MOSFET 61 in the clamp circuit 60a is off, and therefore, the node B is pulled down by the N-channel MOSFET 62. Since a voltage $V_B$ on the node B is at a low level, the output line D of the inverter $I_{71}$ is at a high level, and therefore, the clock signal $\phi$ supplied to the external clock terminal 96 is supplied through the NAND gate $N_{81}$ to the clock input terminal 94 as an internal clock $\phi_5$. Thus, the step-up circuit 50 is put into operation, so that electric charge is supplied to the high voltage output terminal 100 and therefore, the potential Vpp on the high voltage output terminal 100 is rising up.

When the potential Vpp on the high voltage output terminal 100 elevates to a clamp voltage Vcl (=Vdd+|Vtp|, where Vtp is a threshold voltage of the P-channel MOSFET 61), the P-channel MOSFET 61 is turned on so that the potential $V_B$ on the node B is brought into a high level. Accordingly, the potential on the output line D of the inverter $I_{71}$ becomes the low level (which constitutes a voltage detection signal), and the output $\phi_5$ of the NAND gate $N_{81}$ is brought into a high level.

Accordingly, the clock signal $\phi$ supplied to the external clock terminal 96 is not transmitted to the clock input terminal 94, and therefore, the step-up circuit 50 stops its operation.

As mentioned above, the constant voltage generating circuit shown in FIG. 1A is configured to detect that the potential Vpp on the high voltage output terminal 100 elevates to the clamp voltage Vcl, and to stop the step-up circuit 50 in response to the voltage detection signal, so that a wasteful operation of the step-up circuit after the voltage elevation has been completed is prevented so as to reduce a consumed electric power, and also to prevent generation of noises.

Incidentally, in the constant voltage generating circuit shown in FIG. 1A, when the voltage elevation is completed and therefore when the operation of the step-up circuit 50 is stopped, the elevation of the potential Vpp on the high voltage output terminal 100 stops, so that the P-channel MOSFET 61 is turned off. Therefore, the potential $V_B$ on the node B is pulled down by the N-channel MOSFET 62 and drops below a logical threshold voltage of the inverter $I_{71}$.

Accordingly, the potential of the output line D of the inverter $I_{71}$ is brought to the high level, so that the clock signal $\phi$ is supplied through the NAND gate $N_{81}$ to the clock input terminal 94, and therefore, the step-up circuit 5 starts its operation again. As a result, the potential Vpp on the high voltage output terminal 100 elevates to the clamp voltage, and the voltage detection signal D is outputted again so as to stop the operation of the step-up circuit 50. These operations are repeated during each voltage elevating period.

Another example of this type constant voltage generating circuit is disclosed in Japanese Patent Application Laid-open Publication JP-A-62-197998. Referring to FIG. 2A, there is shown the constant voltage generating circuit disclosed in this publication JP-A-62-197998, which comprises a step-up circuit 50, a clamp circuit 60b, a voltage detecting circuit 70b and a clock control circuit 80b. In FIG. 2A, elements corresponding to those shown in FIG. 1A are given the same Reference Numerals, and explanation thereof will be omitted.

The clamp circuit 60b includes N-channel MOSFETs 63 to 66 which are connected in series between the high voltage output terminal 100 (Vpp) and the ground and each of which has a drain and a gate interconnected to each other.

The voltage detection circuit 70b includes an inverter $I_{72}$ having an input connected to a connection node E between the N-channel MOSFETs 65 and 66, and another inverter $I_{73}$ having an input connected to an output of the inverter $I_{72}$.

The clock control circuit 80b includes a frequency-division circuit 81 having an input connected to the external clock terminal 96 ($\phi$), a NAND gate $N_{83}$ having a first input connected to the external clock terminal 96 (ϕ) and a second input connected to receive an output F of the inverter $I_{73}$ through an inverter $I_{81}$, another NAND gate $N_{84}$ having a first input connected to an output of the frequency-division circuit 81 and a second input connected to the output F of the inverter $I_{73}$, and still another NAND gate $N_{82}$ having a first input connected to an output of the NAND gate $N_{83}$ and a second input connected to an output of the NAND gate $N_{84}$, an output of the NAND gate $N_{82}$ being connected to the clock input terminal 96 (ϕ).

The step-up circuit 50 is similar to that shown in FIG. 1A, and therefore, explanation thereof will be omitted.

Now, operation of the constant voltage generating circuit shown in FIG. 2A will be explained with reference to FIG. 2B.

When the voltage elevating operation is started, a potential Vpp on the high voltage output terminal 100 is at a low level, and only an off current flows through the series-connected N-channel MOSFETs 63, 64, 65 and 66 in the clamp circuit 60b. Therefore, a potential $V_E$ on the node E is pull down to a threshold $V_{TN}$ of the N-channel MOSFET 66 by action of the N-channel MOSFET 66, and accordingly, a potential on the output line F of the inverter $I_{73}$ is at a low level. As a result, the clock signal ϕ applied from the external clock terminal 96 is supplied through the NAND gates $N_{83}$ and $N_{82}$ to the clock input terminal 94 as an internal clock ϕ6, and therefore, the step-up circuit 50 starts to operate, so that electric charge is supplied to the high voltage output terminal 100, and accordingly, the potential Vpp on the high voltage output terminal 100 is elevating.

With the above voltage elevating operation, when the potential Vpp on the high voltage output terminal 100 reaches a clamp voltage Vcl (=4×$V_{TN}$, where $V_{TN}$ is a threshold of the N-channel MOSFETs 63 to 66), the N-channel MOSFETs 63 to 65 are turned on so that the potential $V_E$ on the node E is pulled up to a high level, and the potential on the output line F of the inverter $I_{73}$ is brought to a high level. Accordingly, the clock signal ϕ applied to the external clock terminal 96 is frequency-divided to one fourth of the frequency of the external clock by the frequency-division circuit 81, and the frequency-divided clock signal is supplied through the NAND gates $N_{84}$ and $N_{82}$ to the clock input terminal 94 as the internal clock ϕ6. As a result, the step-up circuit 50 operates with the frequency-divided, namely, low frequency, clock signal.

As mentioned above, the constant voltage generating circuit shown in FIG. 2A is configured to detect that the potential Vpp on the high voltage output terminal 100 elevates to the clamp voltage Vcl, and to supply the frequency-divided, low frequency, dock signal to the step-up circuit 50 in response to the voltage detection signal, so that a consumed electric power of the step-up circuit after the voltage elevation is reduced and generation of noises is prevented.

In ordinary cases, however, to the high voltage output terminal 100 is connected a load including not only a capacitive component CL and a resistive component RL caused by a wiring conductor resistance, as illustrated in FIG. 3.

In the conventional constant voltage generating circuit shown in FIG. 1A, since the voltage Vpp on the high voltage output terminal 100 is detected, when the high voltage output terminal 100 is connected to a load including a resistive component RL shown in FIG. 3, an output current Ipp flowing out from the high voltage output terminal 100 pulsates in synchronism with the clock signal ϕ.

Therefore, as shown in FIG. 1B, an overshoot occurs on the potential Vpp on the high voltage output terminal 100, so that when a peak of this overshoot voltage reaches the clamp voltage Vcl, the voltage detection signal is generated, with the result that the clock signal ϕ becomes not transmitted to the clock input terminal 94 (ϕ$_5$), and therefore, the step-up circuit 50 stops its operation.

Thereafter, the potential Vpp on the high voltage output terminal 100 drops by a voltage of the overshoot component, since the electric charge is transferred through the resistive component RL to the capacitive component CL of the load. Accordingly, although the potential on the overshoot is lower than the clamp voltage Vcl, the elevation of the potential Vpp on the high voltage output terminal 100 stops.

The voltage of the overshoot component is defined by Ipp×RL. Since the output current Ipp flowing in response to the clock signal is on the order of 10 mA at maximum, if the resistive component RL caused by the wiring conductor resistance is on the order of 100 Ω, the voltage of the overshoot component becomes 1 V. Accordingly, the voltage elevation stops with Vpp=Vcl−1 (V).

After the voltage elevation stops, the potential $V_B$ on the node B is pulled down by means of the N-channel MOSFET 62 and gradually lowers. At the moment the potential $V_B$ on the node B lowers smaller than the threshold voltage of the inverter $I_{71}$, the clock signal is supplied to the step-up circuit 50 again, and the step-up circuit 50 re-starts its operation.

Thus, the potential Vpp on the high voltage output terminal 100 elevates to the clamp voltage Vcl for the first time. As a result, a period of time Tup required for a necessary voltage elevation becomes extremely long.

Here, it may be considered that the factor "gm" of the N-channel MOSFET 62 is set to a large value, so that the pull-down of the potential $V_B$ on the node B is speeded up, with the result that the period of time Tup for the voltage elevation is shortened. In this approach, however, the operation in which after the step-up circuit 50 stops its operation because of the completion of the voltage elevation, the potential on the node B is pulled down, and then, the step-up circuit 50 is caused to re-start its operation, is repeated at short intervals. This results in an increased consumed power and in increase of the noises.

Furthermore, after the voltage $V_B$ on the node B becomes the high level, the voltage $V_B$ on the node B is pulled down through the N-channel MOSFET 62 and therefore gradually lowers. Accordingly, the input of the inverter $I_{71}$ (constituting the voltage detection circuit 70a) is biased an intermediate level for a long period of time, so that a pass-through current flows in the inverter $I_{71}$. As a result, the consumed electric power is increased, and a voltage supply noise and ground noise are induced.

Also in the conventional constant voltage generating circuit shown in FIG. 2A, since the voltage Vpp on the high voltage output terminal 100 is detected similarly to the conventional constant voltage generating circuit shown in FIG. 1A, when the high voltage output terminal 100 is connected to a load including a resistive component RL shown in FIG. 3, a period of time Tup required for a necessary voltage elevation becomes extremely long as shown in FIG. 2B.

In the conventional constant voltage generating circuit shown in FIG. 2A, it is possible to shorten the period of time Tup for the voltage elevation, by setting the frequency-division ratio, for example, to ½ in place of ¼. In this approach, however, since the operating frequency after the completion of the voltage elevation is not set to a low value, both of the consumed electric power and the generation of the noise are increased.

In addition, since the potential $V_E$ on the node E is Vpp–3 $V_{TN}$, in the case that the load capacitance is large and therefore the voltage elevation velocity of the high voltage output terminal is low, the input of the inverter $I_{72}$ (constituting the voltage detection circuit 70b) is biased at an intermediate level for a long period of time, so that a pass-through current flows in the inverter $I_{72}$. As a result, the consumed electric power is increased, and both of a voltage supply noise and ground noise are induced.

As mentioned above, since the conventional constant voltage generating circuits shown in FIGS. 1A and 2A are so constructed to detect the potential Vpp on the high voltage output terminal 100, these conventional circuits are disadvantageous in that when a load including a resistive component is driven, it is not possible to simultaneously realize both the shortening of the period of time Tup for the voltage elevation and the reduction of the consumed electric power and the noise generation.

Furthermore, since the input of the inverter constituting the voltage detection circuit is biased at an intermediate level for a long period of time, a pass-through current flows in the inverter, with the result that the consumed electric power is increased, and both of a voltage supply noise and ground noise are induced.

SUMMARY OF THE INVENTION

Accordingly, it is an object of the present invention to provide a constant voltage generating circuit which has overcome the above mentioned defects of the conventional ones.

Another object of the present invention is to provide a constant voltage generating circuit capable of simultaneously realizing both the shortening of the period of time for the voltage elevation and the reduction of the consumed electric power and the noise generation, even if the constant voltage generating circuit is connected to drive a load including a resistive component.

A further object of the present invention is to provide a constant voltage generating circuit capable of operating with a reduced consumed electric power and with minimized voltage supply and ground noises.

The above and other objects of the present invention are achieved in accordance with the present invention by a constant voltage generating circuit comprising a step-up circuit of a charge pump type for generating a predetermined high voltage by action of a charge pumping in response to a clock signal, a high voltage output terminal connected to an output of the step-up circuit for outputting the generated high voltage, a clamp circuit connected between the high voltage output terminal and a first voltage supply terminal, a charge detection circuit reset by a reset signal and operating to generate a charge detection signal when a current having flowed through the clamp circuit reaches a predetermined value, and a clock control circuit including a RS flip flop reset by the reset signal and set by the charge detection signal, the clock control circuit operating to respond to the charge detection signal so as to stop application of the clock signal to the step-up circuit.

The above and other objects, features and advantages of the present invention will be apparent from the following description of preferred embodiments of the invention with reference to the accompanying drawings.

BRIEF DESCRIPTION OF THE DRAWINGS

FIG. 5A is a timing chart showing a waveform diagram on various points in first and second embodiments of the constant voltage generating circuit in accordance with the present invention, for illustrating an operation of the first and second embodiments of the constant voltage generating circuit in accordance with the present invention;

FIG. 5B is a timing chart similar to that shown in FIG. 5A, but illustrating an operation of the first and second embodiments of the constant voltage generating circuit in accordance with the present invention when the reset signal is applied two or more times.

DESCRIPTION OF THE PREFERRED EMBODIMENTS

Figure 4:
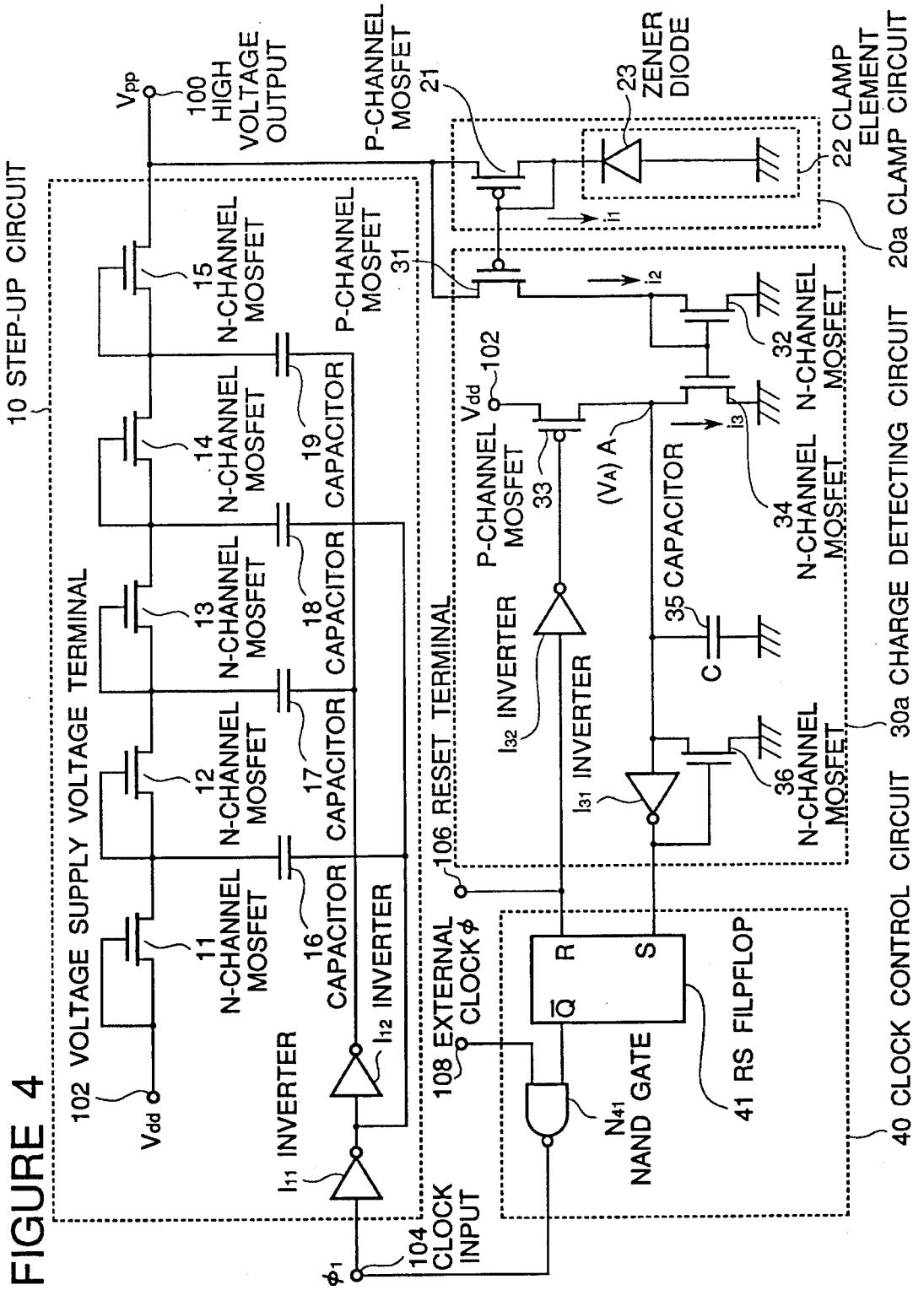
FIG. 4 is a circuit diagram of a first embodiment of the constant voltage generating circuit in accordance with the present invention.

Referring to FIG. 4, there is shown a circuit diagram of a first embodiment of the constant voltage generating circuit in accordance with the present invention.

The shown constant voltage generating circuit comprises a step-up circuit 10 of a charge-pump type, a clamp circuit 20a, a charge detecting circuit 30a and a clock control circuit 40 and a high voltage output terminal 100 (Vpp).

The step-up circuit 10 includes a plurality of N-channel MOSFETs 11 to 15 each of which has a drain electrode and a gate electrode interconnected to each other and which are connected in series between a voltage supply voltage terminal 102 (Vdd) and the high voltage output terminal 100 (Vpp). A gate-drain connecting node of each of the N-channel MOSFETs 12 and 14 is connected through a capacitor 16 or 18 to an output of an inverter $I_{11}$, and a gate-drain connecting node of each of the N-channel MOSFETs 13 and 15 is connected through a capacitor 17 or 19 to an output of an inverter $I_{12}$. An input of the inverter $I_{11}$ is connected to a clock input terminal 104 (φ1), and an input of the inverter $I_{12}$ is connected to the output of the inverter $I_{11}$. With this arrangement, a high voltage Vpp is generated with a clock signal φ1 applied to the clock input terminal 104.

The clamp circuit 20a includes a P-channel MOSFET 21 having a drain and a gate interconnected to each other and a source connected to the high voltage output terminal 100

(Vpp), and a zener diode 23 having a cathode connected to the drain of the P-channel MOSFET 21 and an anode connected to ground. This zener diode 23 constitutes a clamp element 22 included in the clamp circuit 20a.

The charge detecting circuit 30a includes a P-channel MOSFET 31 having a source connected to the high voltage output terminal 100 (Vpp) and a gate connected to the gate of the P-channel MOSFET 21, a source-grounded N-channel MOSFET 32 having a drain and a gate connected in common to a drain of the P-channel MOSFET 31, a P-channel MOSFET 33 having a source connected to the voltage supply voltage terminal 102 (Vdd) and a gate connected to an output of an inverter $I_{32}$ having an input connected to a reset terminal 106, a source-grounded N-channel MOSFET 34 having a drain connected to a drain of the P-channel MOSFET 33 and a gate connected to the gate of the N-channel MOSFET 32, a capacitor 35 of a capacitance C having its one electrode connected to a connection node A between the P-channel MOSFET 33 and the N-channel MOSFET 34 and its other electrode connected to ground, an inverter $I_{31}$ having an input connected to the node A, and a source-grounded N-channel MOSFET 36 having a drain connected to the node A and a gate connected to an output of the inverter $I_{31}$.

The clock control circuit 40 includes a RS flipflop (reset-set flipflop) 41 having a reset input "R" connected to the reset terminal 106 and a set terminal "S" connected to receive a charge detection signal outputted from the charge detection circuit 30a (specifically, from the inverter $I_{32}$), and a NAND gate $N_{41}$ having a first input connected to the external clock input 108 ($\phi$) and a second input connected to an inverted output Q of the RS flipflop 41, an output of the NAND gate $N_{41}$ being connected to the clock input terminal 104 ($\phi1$).

Now, operation of the first embodiment will be described with reference to FIG. 5A, which is a timing chart illustrating the operation of the first embodiment.

First, if the reset signal R supplied to the reset terminal 106 is maintained at a high level for a predetermined period of time, the P-channel MOSFET 33 are turned on, so that the capacitor 35 is charged up. A potential $V_A$ on the node A becomes the voltage supply voltage Vdd, and the RS flipflop 41 is reset, so that the inverted output Q of the RS flipflop 41 outputs a high level so as to open the NAND gate $N_{41}$. Thus, the clock signal $\phi$ is supplied from the external clock input 106 through the NAND gate $N_{41}$ to the clock input terminal 104 of the step-up circuit 10. Accordingly, the step-up circuit 10 starts its charge-pumping operation, so that the potential Vpp on the high voltage output terminal 100 is elevating.

If, by the action of the voltage elevating operation, the potential Vpp on the high voltage output terminal 100 reaches a clamp voltage (the threshold voltage of the P-channel MOSFET 21 plus a breakdown voltage of the zener diode 23), a current $i_1$ starts to flow in the clamp circuit 20a, and also, a current $i_2$ flows through the P-channel MOSFET 31, which constitutes a current mirror circuit in cooperation with the P-channel MOSFET 21. Furthermore, a current $i_3$ flows through the N-channel MOSFET 34, which constitutes a current mirror circuit in cooperation with the N-channel MOSFET 32 connected in series with the P-channel MOSFET 31.

Here, the current $i_3$ is expressed by the following equations. In the following equations, gm(21), gm(31), gm(32) and gm(34) are a transconductance gm of the MOSFETs 21, 31, 32 and 34, respectively.

$$i_2 = \frac{gm_{(31)}}{gm_{(21)}} \times i_1 \quad (1)$$

$$i_3 = \frac{gm_{(34)}}{gm_{(32)}} \times i_2$$

$$i_3 = \frac{gm_{(31)}}{gm_{(21)}} \times \frac{gm_{(34)}}{gm_{(32)}} \times i_1$$

In addition, since the current $i_3$ flows through the N-channel MOSFET 34, the electric charge accumulated in the capacitor 35 is discharged so that the potential $V_A$ on the node A drops from Vdd. This potential $V_A$ on the node A can be expressed as follows:

$$V_A = V_{dd} - \frac{1}{C} \int i_3 \, dt \quad (2)$$

$$= V_{dd} - \frac{1}{C} \times \frac{gm_{(31)}}{gm_{(21)}} \times \frac{gm_{(34)}}{gm_{(32)}} \int i_1 \, dt$$

Here, at the moment the potential $V_A$ on the node A drops to a logic threshold voltage $V_{TH31}$ of the inverter $I_{31}$, the output of the inverter $I_{31}$ changes from the low level to the high level, so that the charge detection signal is outputted, and at the same time, the N-channel MOSFET 36 is turned on so as to rapidly discharge the electric charge accumulated in the capacitor 35. As a result, the potential $V_A$ on the node A rapidly drops to the ground level. Under the condition of $V_{TH31}=V_A$, a condition for generation of the charge detection Signal is given as follows:

$$\int_0^{T1} i_1 \, dt = \frac{gm_{(21)}}{gm_{(31)}} \times \frac{gm_{(32)}}{gm_{(34)}} \times C(V_{dd} - V_{TH31}) \quad (3)$$

In the above equation (3), the integration range (0 to T1) corresponds to a period of time starting from the moment the reset signal R is applied and terminating at the moment the charge detection signal "S" is generated. Therefore, the above equation (3) is indicative of the amount of electric charge which has flowed in the clamp circuit 20a during the period of time starting from the moment the reset signal R is applied and terminating at the moment the charge detection signal "S" is generated. In other words, the charge detection signal "S" is activated when the mount of electric charge having flowed in the clamp circuit 20a reaches a predetermined value set by various factors included in the right side of the equation (3), namely, the transconductances gm(21), gm(31), gm(32) and gm(34), the capacitance C and the logic threshold voltage $V_{TH31}$ of the inverter $I_{31}$.

If the charge detection signal is outputted, the RS flipflop 41 is set, so that the inverted output Q of the RS flipflop is brought to the low level, and therefore, the output of the NAND gate $N_{41}$ is fixed to the high level. As a result, the clock signal $\phi$ applied to the external clock terminal 108 is not transmitted to the clock input 104 ($\phi1$), and accordingly, the step-up circuit 10 stops its step-up operation. Thus, the consumed electric power is reduced, and generation of the noises is prevented.

Figure 1A:
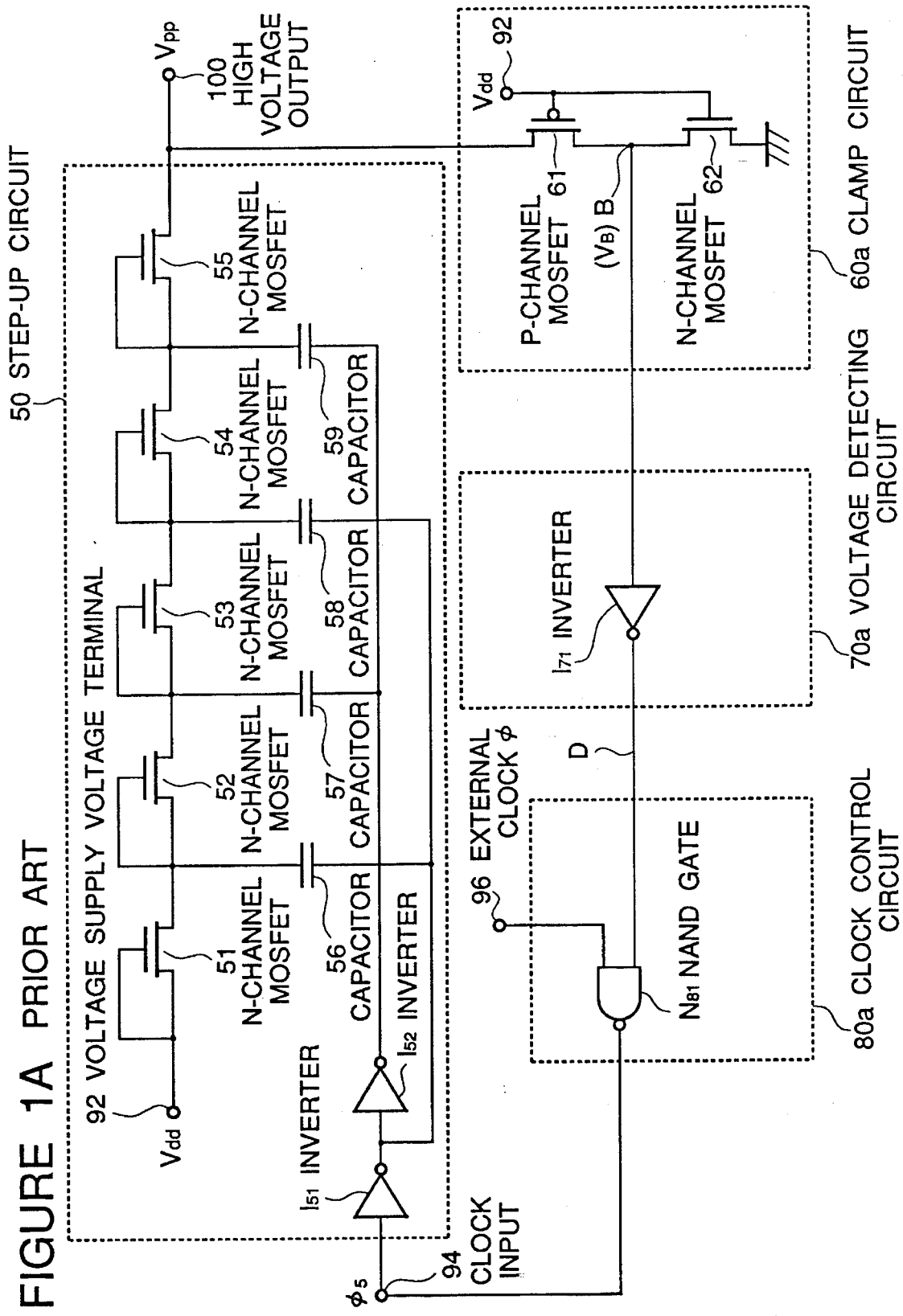
FIG. 1A is a circuit diagram of a first conventional constant voltage generating circuit.
Figure 1B:
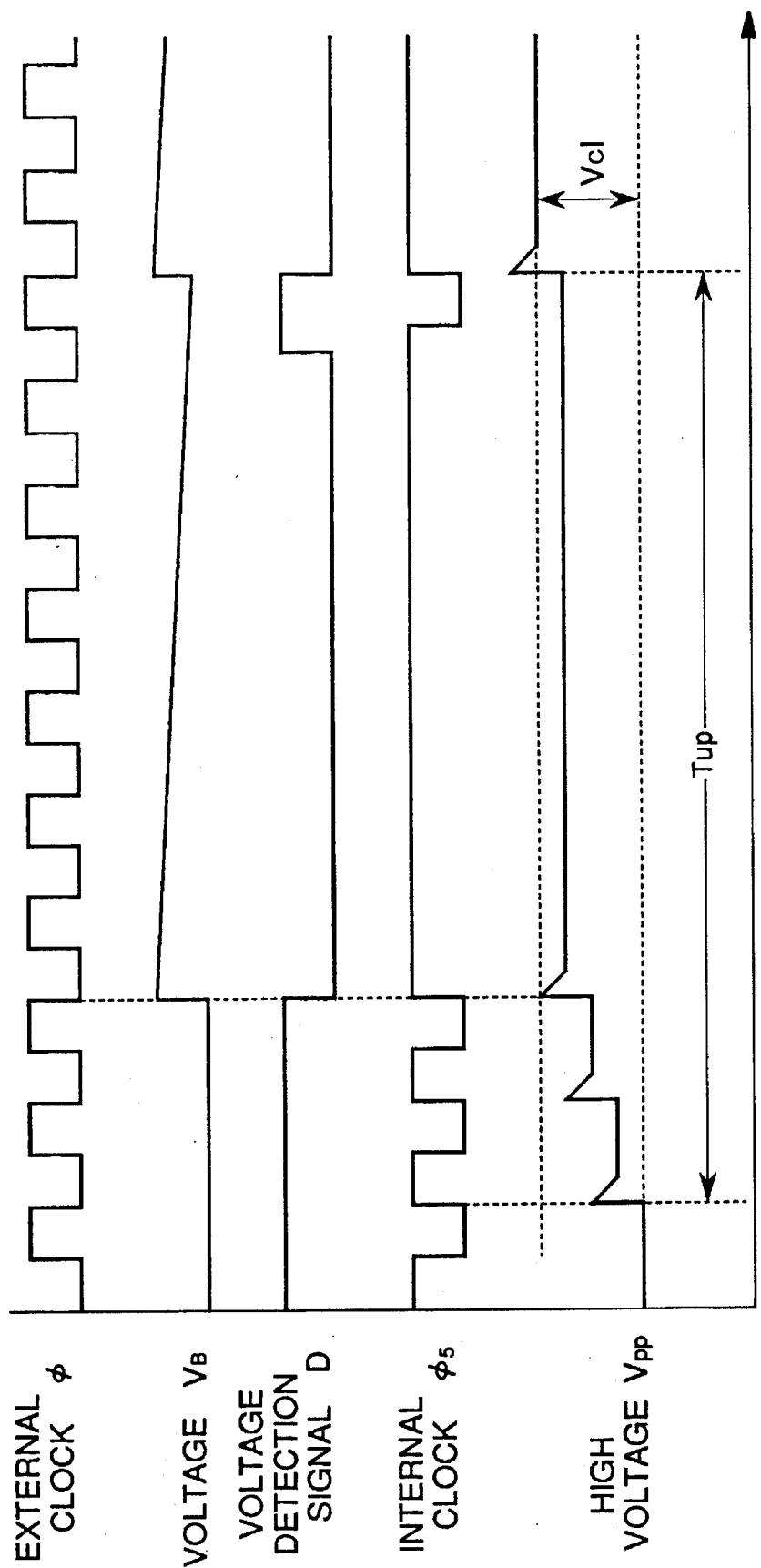
FIG. 1B is a timing chart showing a waveform diagram on various points in the conventional constant voltage generating circuit shown in FIG. 1A, for illustrating an operation of the conventional constant voltage generating circuit shown in FIG. 1A.
Figure 2A:
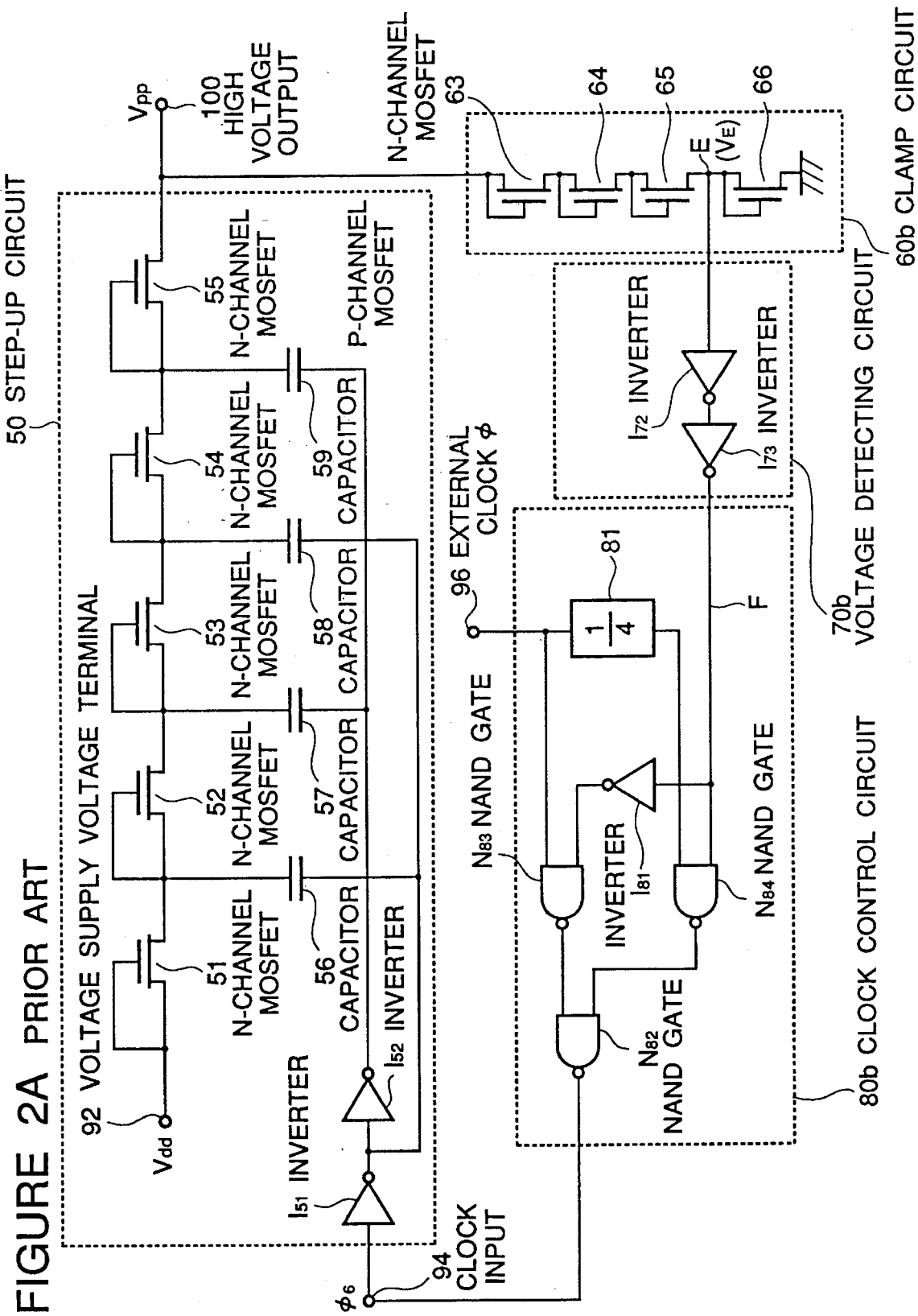
FIG. 2A is a circuit diagram of a second conventional constant voltage generating circuit.
Figure 2B:
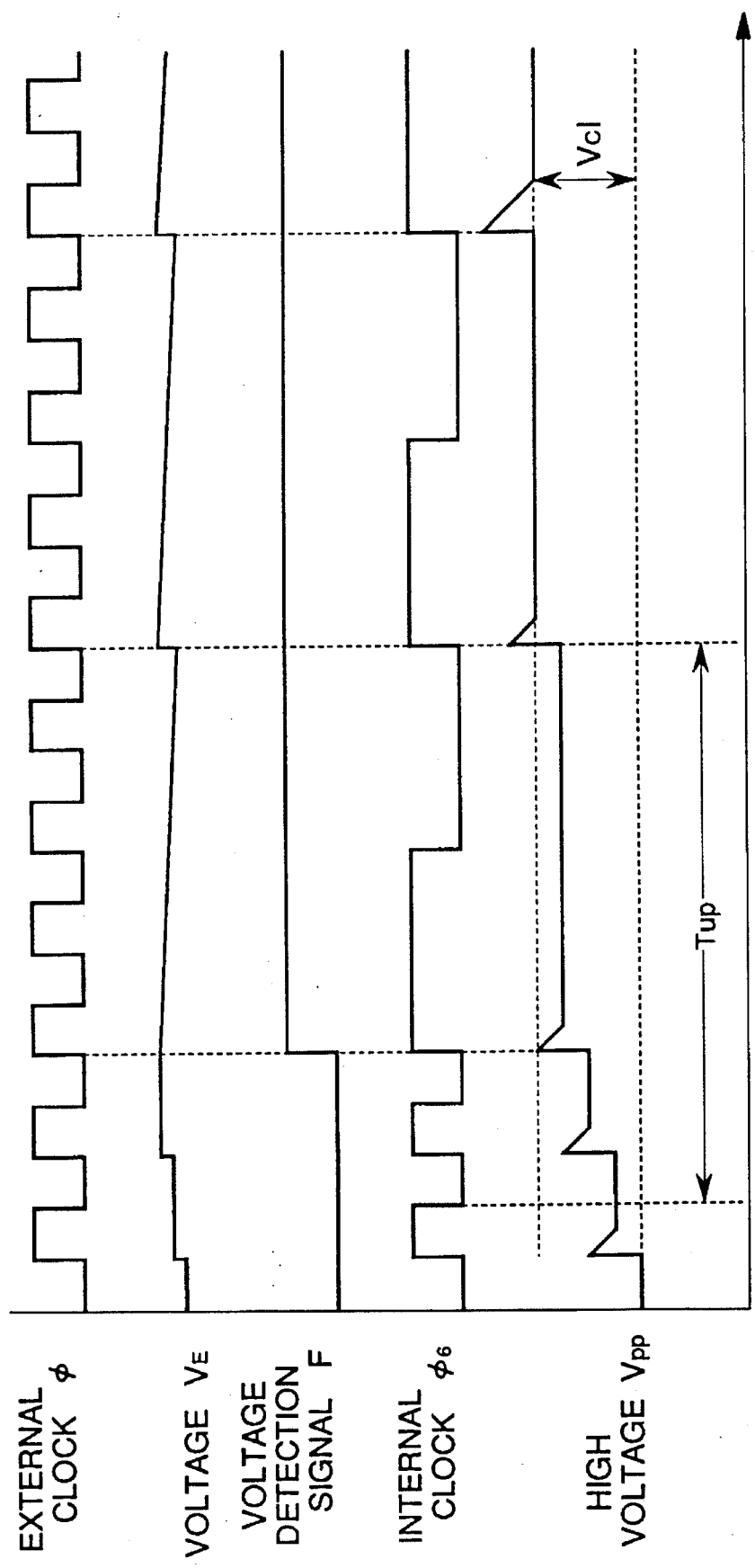
FIG. 2B is a timing chart showing a waveform diagram on various points in the conventional constant voltage generating circuit shown in FIG. 2A, for illustrating an operation of the conventional constant voltage generating circuit shown in FIG. 2A.
Figure 3:
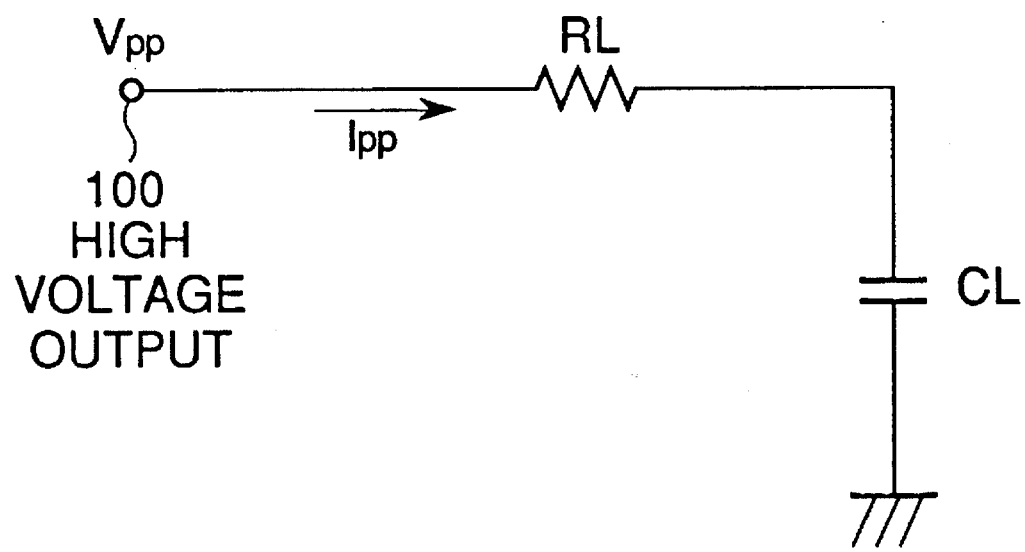
FIG. 3 is an equivalent circuit diagram of a load which includes a resistive component and a capacitive component and which is connected to a high voltage output terminal of a constant voltage generating circuit.

As mentioned above, the first embodiment of the constant voltage generating circuit in accordance with the present invention is so constructed that the charge detecting circuit 30a detects that the mount of electric charge having flowed in the clamp circuit 20a reaches a predetermined value given by the equation (3). When a load including the resistive component RL is connected to the high voltage output terminal 100 as shown in FIG. 3, an overshoot occurs in the potential Vpp on the high voltage output terminal 100. Accordingly, the current (electric charge) flowing through the clamp circuit 20a pulsates. However, by adjusting the predetermined value given by the equation (3), it becomes possible to output the charge detection signal after the potential Vpp on the high voltage output terminal 100 has reached the clamp voltage Vcl. Accordingly, it is possible not only to shorten the period of time Tup required for the voltage elevation but also to reduce both the consumed electric power and the noise generation.

After the charge detection signal is outputted, since the potential $V_A$ on the node A is rapidly pulled down, no pass-through current flows in the inverter $I_{31}$. Accordingly, the consumed electric power can be made zero (0), and neither the voltage supply noise nor the ground noise is induced.

Referring to FIG. 5B, them is shown a timing chart when the reset signal R is applied to the reset terminal 106 a plurality of times in the above mentioned first embodiment of the present invention.

In the case that the load connected to the high voltage output terminal 100 includes a leak path so that the potential Vpp on the high voltage output terminal 100 lowers with time, it is possible to maintain the potential Vpp on the high voltage output terminal 100 around the clamp voltage Vcl, by periodically supplying the reset signal R as shown in FIG. 5B so as to cause the step,up circuit 10 to periodically operate for the purpose of compensating for the electric charge discharged through the leak path.

The operation other than the charge compensating operation is the same as the above mentioned operation, and therefore, further explanation will be omitted.

Figure 6:
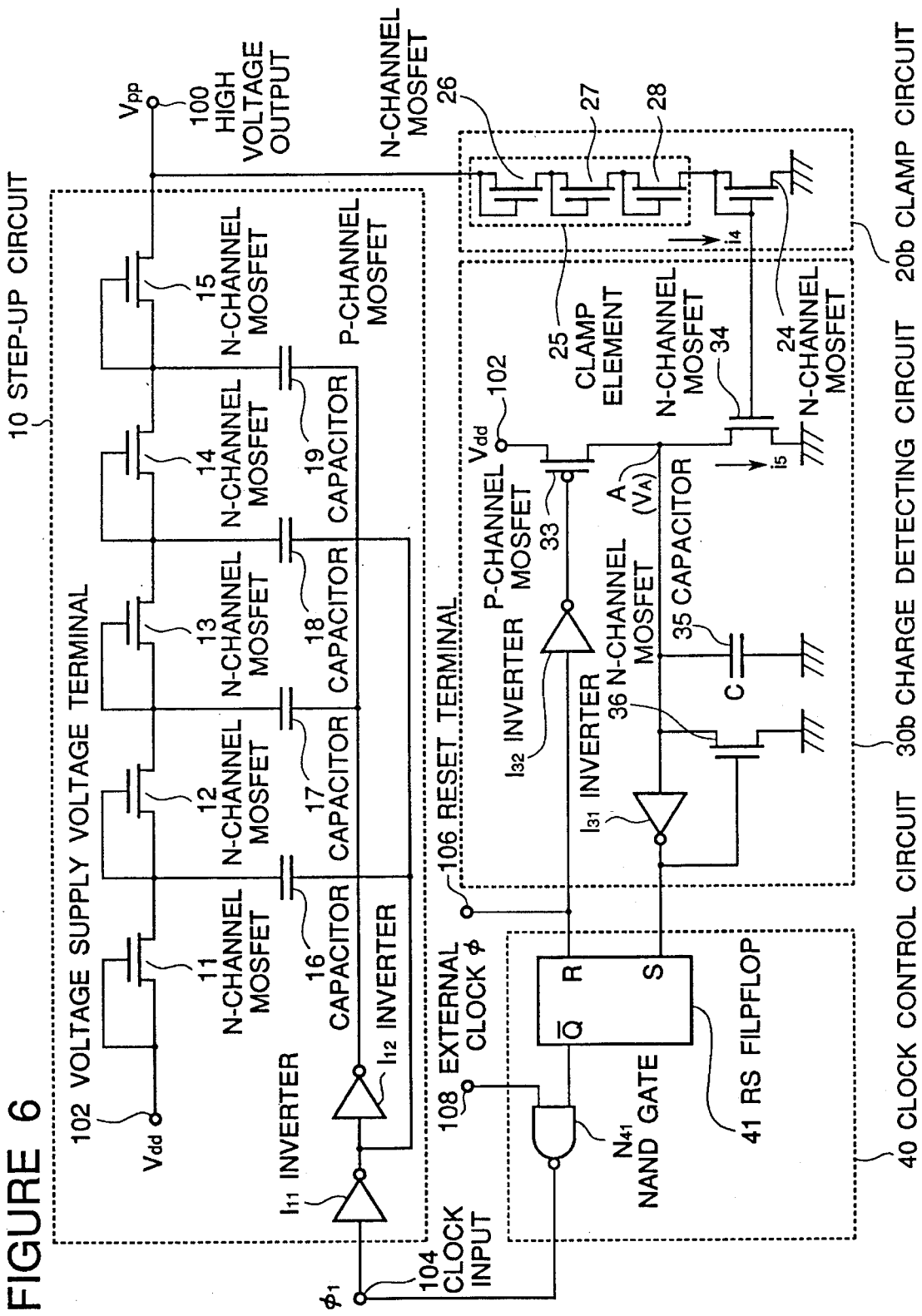
FIG. 6 is a circuit diagram of a second embodiment of the constant voltage generating circuit in accordance with the present invention.

Referring to FIG. 6, there is shown is a circuit diagram of a second embodiment of the constant voltage generating circuit in accordance with the present invention. In FIG. 6, elements similar to those shown in FIG. 4 are given the same Reference Numerals, and explanation thereof will be omitted.

As seen from comparison between FIGS. 4 and 6, the second embodiment includes a clamp circuit 20b and a charge detecting circuit 30b which are different from the clamp circuit 20a and the charge detecting circuit 30a of the first embodiment, respectively. In the other aspects, the second embodiment is the same as the first embodiment.

The clamp circuit 20b includes a source-grounded N-channel MOSFET 24 having a drain and a gate interconnected to each other, and a clamp element 25 connected between the drain of the N-channel MOSFET 24 and the high voltage output terminal 100. The clamp element 25 is composed of a plurality of N-channel MOSFETs 26 to 28 each of which has a drain and a gate interconnected to each other, and which are connected in series between the drain of the N-channel MOSFET 24 and the high voltage output terminal 100.

The charge detecting circuit 30b includes a P-channel MOSFET 33 having a source connected to the voltage supply voltage terminal 102 (Vdd) and a gate connected to an output of an inverter $I_{32}$ having an input connected to a reset terminal 106, a source-grounded N-channel MOSFET 34 having a drain connected to a drain of the P-channel MOSFET 33 and a gate connected to the gate of the N-channel MOSFET 24, a capacitor 35 of a capacitance C having its one electrode connected to a connection node A between the P-channel MOSFET 33 and the N-channel MOSFET 34 and its other electrode connected to ground, an inverter $I_{31}$ having an input connected to the node A, and a source-grounded N-channel MOSFET 36 having a drain connected to the node A and a gate connected to an output of the inverter $I_{31}$.

As seen from FIG. 6, since the N-channel MOSFET 24 and the N-channel MOSFET 34 cooperates to constitute a current mirror, when a current $i_4$ flows through the clamp circuit 20b, a current $i_5$ flows through the N-channel MOSFET 34. This current $i_5$ is expressed by the following equation. In the following equation, gm(24) and gm(34) are a transconductance gm of the MOSFETs 24 and 34, respectively.

$$i_5 = \frac{gm_{(34)}}{gm_{(24)}} \times i_4 \quad (4)$$

In addition, since the current $i_5$ flows through the N-channel MOSFET 34, the electric charge accumulated in the capacitor 35 is discharged so that a potential $V_A$ on the node A drops from Vdd. This potential $V_A$ on the node A can be expressed as follows:

$$\begin{aligned} V_A &= V_{dd} - \frac{1}{C} \int i_5 \, dt \\ &= V_{dd} - \frac{1}{C} \times \frac{gm_{(34)}}{gm_{(24)}} \int i_4 \, dt \end{aligned} \quad (5)$$

Here, at the moment the potential $V_A$ on the node A drops to a logic threshold voltage $V_{TH31}$ of the inverter $I_{31}$, the output of the inverter $I_{31}$ changes from the low level to the high level, so that the charge detection signal is outputted, and at the same time, the N-channel MOSFET 36 is turned on so as to rapidly discharge the electric charge accumulated in the capacitor 35. As a result, the potential $V_A$ on the node A rapidly drops to the ground level. Under the condition of $V_{TH31} = V_A$, a condition for generation of the charge detection signal is given as follows:

$$\int_0^{T1} i_4 \, dt = \frac{gm_{(24)}}{gm_{(34)}} \times C(V_{dd} - V_{TH31}) \quad (6)$$

In the above equation (6), the integration range (0 to T1) corresponds to a period of time starting from the moment the reset signal R is applied and terminating at the moment the charge detection signal is generated. Therefore, the above equation (6) is indicative of the amount of electric charge which has flowed in the damp circuit 20b during the period of time starting from the moment the reset signal R is applied and terminating at the moment the charge detection signal is generated. In other words, the charge detection signal is generated when the amount of electric charge having flowed in the clamp circuit 20b reaches a predetermined value set by various factors included in the fight side of the equation (6), namely, the transconductances gm(24) and gm(34), the capacitance C and the logic threshold voltage $V_{TH31}$ of the inverter $I_{31}$.

The other operation of the second embodiment is similar to that of the first embodiment, and therefore, explanation will be omitted.

As seen from the above, since the second embodiment is such that the N-channel MOSFET 24 having the drain and the gate interconnected to each other is inserted between the clamp element 25 and the ground, the second embodiment has not only the advantages obtained in the first embodiment, but also another advantage in which the number of the elements required for constituting the charge detecting circuit 30b can be reduced, and therefore, the constant voltage generating circuit can be formed on a reduced chip area.

The above mentioned embodiments have been configured to generate a positive high voltage. It would be a matter of course to persons skilled in the art that it is possible to similarly constitute a constant voltage generating circuit for generating a negative high voltage, by inverting the polarity of the voltage supply and the polarity of the MOSFETs in the embodiments.

As will be sufficiently understood from the above explanation of the embodiments, the constant voltage generating circuit in accordance with the present invention is so configured that when it is detected that the amount of electric charge having flowed through the clamp circuit reaches the predetermined value, the application of the clock to the step-up circuit is stopped. Accordingly, even if a load including a resistive component is driven by the generated high voltage, the period of time required for the voltage elevation can be shortened, and simultaneously, both of the consumed electric power and the generation of the noises can be reduced.

In addition, after the charge detection signal is generated, the input of the inverter included in the charge detecting circuit is in no way biased to an intermediate level. Accordingly, no pass-through current flows through the inverter concerned, and therefore, the consumed electric power is not increased. Furthermore, neither the voltage supply noise nor the ground noise is induced.

The invention has thus been shown and described with reference to the specific embodiments. However, it should be noted that the present invention is in no way limited to the details of the illustrated structures but changes and modifications may be made within the scope of the appended claims.

I claim:

1. A constant voltage generating circuit comprising:

a step-up circuit of a charge pump type for generating a predetermined high voltage by action of a charge pumping in response to a clock signal;

a high voltage output terminal connected to an output of said step-up circuit for outputting the generated high voltage;

a clamp circuit connected between said high voltage output terminal and a first voltage supply terminal, said clamp circuit including a clamp element and a first MOSFET of a first channel type having a drain and a gate interconnected to each other, said first MOSFET and said clamp element being connected in series between said high voltage output terminal and said first voltage supply terminal;

a charge detecting circuit reset by a reset signal and operating to generate a charge detection signal when a current having flowed through said clamp circuit reaches a predetermined value, said charge detecting circuit including a second MOSFET of said first channel type having a source connected to said high voltage output terminal and a gate connected to the gate and the drain of said first MOSFET, a third MOSFET of a second channel type opposite to said first channel type, having a gate and a drain connected in common to a drain of said second MOSFET, and a source connected to said first voltage supply terminal, a fourth MOSFET of said first channel type having a source connected to a second voltage supply terminal and a gate connected to receive an inverted signal of said reset signal, a fifth MOSFET of said second channel type having a drain connected to a drain of said fourth MOSFET, a gate connected to said gate of third MOSFET, and a source connected to said first voltage supply terminal, a capacitor connected between said drain of said fifth MOSFET and said first voltage supply terminal, an invertor having an input connected to said drain of said fifth MOSFET and an output for outputting said charge detection signal, and a sixth MOSFET of said second channel type having a drain connected to said drain of said fifth MOSFET, a gate connected to said output of said invertor, and a source connected to said first voltage supply terminal;

a clock control circuit responding to said charge detection signal so as to stop application of said clock signal to said step-up circuit.

2. A constant voltage generating circuit claimed in claim 1 wherein said clock control circuit includes a RS flipflop reset by said reset signal and set by said charge detection signal, said clock control circuit operating to stop application of said clock signal to said step-up circuit when said RS flipflop is set.

3. A constant voltage generating circuit comprising:

a step-up circuit of a charge pump type for generating a predetermined high voltage by action of a charge pumping in response to a clock signal;

a high voltage output terminal connected to an output of said step-up circuit for outputting the generated high voltage;

a clamp circuit connected between said high voltage output terminal and a first voltage supply terminal, said clamp circuit including a clamp element and a first MOSFET of a first channel type having a drain and a gate interconnected to each other, said first MOSFET and said clamp element being connected in series between said high voltage output terminal and said first voltage supply terminal;

a charge detecting circuit reset by a reset signal and operating to generate a charge detection signal when a current having flowed through said clamp circuit reaches a predetermined value, said charge detecting circuit including a second MOSFET of a second channel type opposite to said first channel type, having a source connected to a second voltage supply terminal and a gate connected to receive an inverted signal of said reset signal, a third MOSFET of said first channel type having a drain connected to a drain of said second MOSFET, a gate connected to said gate of said first MOSFET, and a source connected to said first voltage supply terminal, a capacitor connected between said drain of said third MOSFET and said first voltage supply terminal, an invertor having an input connected to said drain of said first MOSFET in an output for outputting said charge detection signal, and a fourth MOSFET of said first channel type having a drain connected to said drain of said third MOSFET, a gate connected to said output of said invertor, and a source connected to said first voltage supply terminal; and a clock control circuit responding to said charge detection signal so as to stop application of said clock signal to said step-up circuit.

4. A constant voltage generating circuit claimed in claim 3 wherein said clock control circuit includes a RS flipflop reset by said reset signal and set by said charge detection signal, said clock control circuit operating to stop application of said clock signal to said step-up circuit when said RS flipflop is set.

5. A constant voltage generating circuit comprising:

a step-up circuit of a charge pump type for generating a predetermined high voltage by action of a charge pumping in response to a clock signal;

a high voltage output terminal connected to an output of the step-up circuit for outputting the generated high voltage;

a clamp circuit connected between the high voltage output terminal and a first voltage supply terminal, said clamp circuit including a clamp element and a first MOSFET of a first channel type having a drain and a gate interconnected to each other, said first MOSFET and said clamp element being connected in series between said high voltage output terminal and said first voltage supply terminal;

a charge detection circuit reset by a reset signal and operating to generate a charge detection signal when a current flowing through the clamp circuit reaches a predetermined value, said charge detecting circuit including a second MOSFET of said first channel type having a source connected to said high voltage output terminal and a gate connected to the gate and the drain of said first MOSFET, a third MOSFET of a second channel type opposite to said first channel type, having a gate and a drain connected in common to a drain of said second MOSFET and a source connected to said first voltage supply terminal, a fourth MOSFET of said first channel type having a source connected to a second voltage supply terminal and a gate connected to receive an inverted signal of said reset signal, a fifth MOSFET of said second channel type having a drain connected to a drain of said fourth MOSFET, a gate connected to said gate of said third MOSFET, and a source connected to said first voltage supply terminal, a capacitor connected between said drain of said fifth MOSFET and said first voltage supply terminal, an invertor having an input connected to said drain of said fifth MOSFET and an output for outputting said charge detection signal, and a sixth MOSFET of said second channel type having a drain connected to said drain of said fifth MOSFET, a gate connected to said output of said invertor, and a source connected to said first voltage supply terminal; and a clock control circuit including a RS flip-flop reset by the reset signal and set by the charge detection signal, the clock control circuit operating to respond to the charge detection signal so as to stop application of the clock signal to the step-up circuit.

6. A constant voltage generating circuit comprising:

a step-up circuit of a charge pump type for generating a predetermined high voltage by action of a charge pumping in response to a clock signal;

a high voltage output terminal connected to an output of the step-up circuit for outputting the generated high voltage;

a clamp circuit connected between the high voltage output terminal and a first voltage supply terminal, said clamp circuit including a clamp element and a first MOSFET of a first channel type having a drain and a gate interconnected to each other, said first MOSFET and said clamp element being connected in series between said high voltage output terminal and said first voltage supply terminal;

a charge detection circuit reset by a reset signal and operating to generate a charge detection signal when a current flowing through the clamp circuit reaches a predetermined value, said charge detecting circuit including a second MOSFET of said second channel type opposite to said first channel type, having a source connected to a second voltage supply terminal and a gate connected to receive an inverted signal of said reset signal, a third MOSFET of said first channel type having a drain connected to a drain of said second MOSFET, a gate connected to said gate of said first MOSFET, and a source connected to said first voltage supply terminal, a capacitor connected between said drain of said third MOSFET and said first voltage supply terminal, an invertor having an input connected to said drain of said third MOSFET and an output for outputting said charge detection signal, and a fourth MOSFET of said first channel type having a drain connected to said drain of said third MOSFET, a gate connected to said output of said invertor, and a source connected to said first voltage supply terminal; and a clock control circuit including a RS flip-flop reset by the reset signal and set by the charge detection signal, the clock control circuit operating to respond to the charge detection signal so as to stop application of the clock signal to the step-up circuit.

* * * * *